B. S. PFEIFFER.
TRACTOR OF THE TRACK LAYING TYPE.
APPLICATION FILED APR. 14, 1919.
1,366,486.
Patented Jan. 25, 1921.
2 SHEETS—SHEET 1.
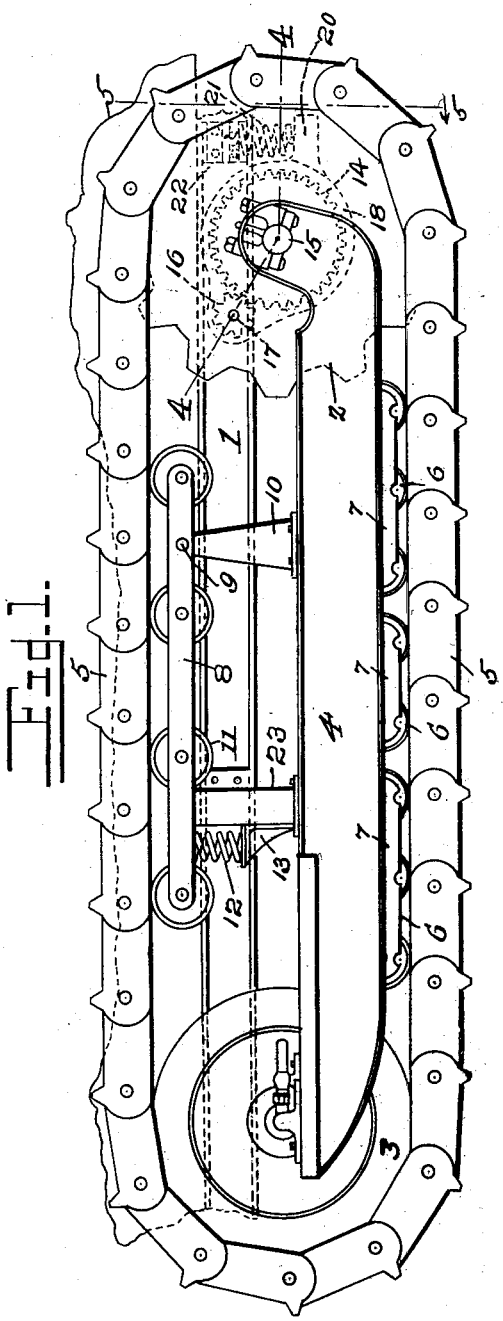
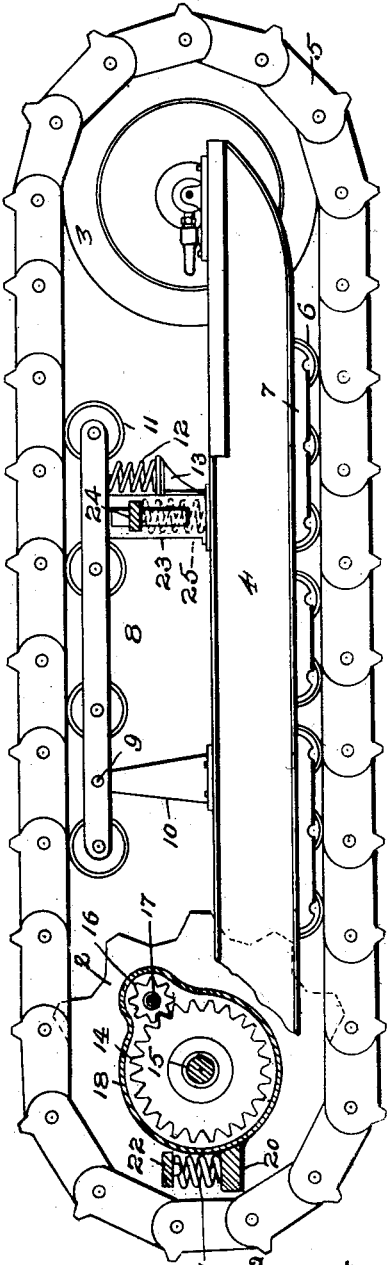
Inventor
Benj. S. Pfeiffer

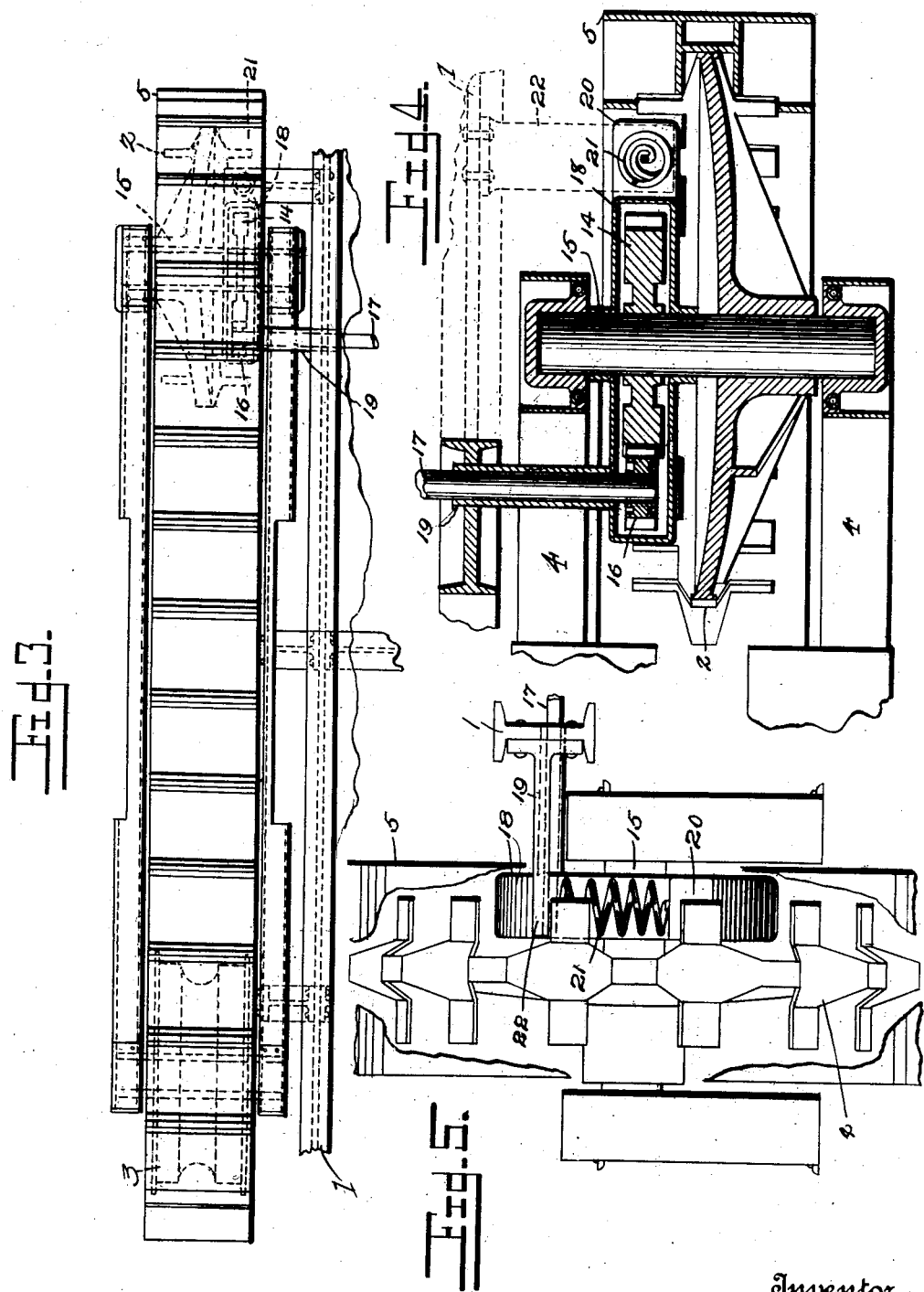

UNITED STATES PATENT OFFICE.

BENJAMIN S. PFEIFFER, OF CHICAGO, ILLINOIS.

TRACTOR OF THE TRACK-LAYING TYPE.

1,366,486.　　　　　Specification of Letters Patent.　　Patented n. 25, 1921.

Application filed April 14, 1919. Serial No. 290,068.

*To all whom it may concern:*

Be it known that I, BENJAMIN S. PFEIFFER, a citizen of the United States, residing at Chicago, in the county of Cook and State of Illinois, have invented new and useful Improvements in Tractors of the Track-Laying Type, of which the following is a specification.

The subject of this invention is a tractor of the tracklaying type and relates more particularly to a spring mounting for the same.

It is usual in structures of this character to have some point of the track mechanism rigidly connected to the chassis or main frame and to avoid undue shocks the driving sprocket and forward idler are elevated from the ground so that there is no contact directly below them, when in normal position. This is only an attempt to minimize the shocks, but as the points immediately below the sprocket and the forward idler often come into contact with the ground, sharp shocks are frequently experienced.

Raising the sprocket and the forward idler sufficiently to avoid road shocks necessarily reduces the effective surface area of the track for a given length of track belt or chain and reduces the tractive effort of the machine.

The present invention is designed to overcome these objections and it contemplates employing a link connection between each track mechanism and the chassis or main frame, and a resilient suspension of the body between the track mechanisms.

The advantages gained from such a structure are:

Complete spring mounting of all parts of the track that come in contact with the ground, which is very necessary in any vehicle; considerable lightening of weight owing to the fact that the vehicle is completely spring mounted; useful surface areas beneath the front idler and the driving sprocket, thus decreasing the necessary overall length of the track without decreasing the efficiency; greater mobility owing to the entirely separate action of each track and complete ground contact, as well as the shortened length of track at all times no matter what position the vehicle is in; removal of all strains from the main frame of the vehicle, owing to the complete spring mounting.

With these and other objects in view, which will more fully appear, the invention resides in the combination and arrangement of parts and in the details of construction hereinafter described and claimed, it being understood that changes in the precise embodiment of the invention as herein disclosed can be made within the scope of what is claimed without departing from the spirit of the invention.

A practical structure embodying the invention is illustrated in the accompanying drawings, wherein—

Figure 1 is a side elevation of a mobile vehicle constructed in accordance with the invention;

Fig. 2 is a side elevation of the opposite side of the structure, parts being in section to show certain details;

Fig. 3 is a plan view of the same structure;

Fig. 4 is an enlarged detail sectional view taken on the line 4—4 of Fig. 1; and, Fig. 5 is a similar view taken on the line 5—5 of Fig. 1.

Each track mechanism consists of a drive sprocket 2 and a forward idler 3, which are held in proper spaced relation by the frame 4, in the respective ends of which they are journaled. An endless track belt or chain 5 is trained over the sprocket 2 and the forward idler 3, and it is to be noted that the upper and lower flights of this chain are parallel, the diameter of the sprocket and the idler being equal. The lower flight of the chain is held in contact with the surface over which the vehicle is passing by any of the usual and well known structures, such as the track rollers 6 which may be mounted in groups and journaled in the housings 7, which are continually pressed downwardly by resilient elements (not shown) interposed between the housing 7 and the frame 4.

From the foregoing it will be seen that the entire extent of the track between the sprocket and the front idler will be retained in contact with the surface over which the vehicle is traveling, and that the track will accommodate itself to variations or irregularities in such surface.

Means are provided for taking up the slack of the endless track belt or chain, such means, as herein shown, consisting of a beam 8 which is pivotally mounted between its ends, as at 9, to the upper end of a standard 10 which rises from and is supported by the frame 4. Rollers 11 are journaled in the beam 8 and contact the under surface of the upper flight of the endless track chain, and are forced thereagainst by a spring 12, the upper end of which engages the beam 8 adjacent its forward end and the other end of which rests on a bracket 13 which is supported on the frame 4.

The gearing for driving sprocket wheel 2, as herein shown, comprises a spur gear 14 which is rigidly connected to the axle 15 of the sprocket wheel 2 and which meshes with a pinion 16 carried on an intermediate shaft 17, which is suitably connected to and driven by the motive power of the vehicle.

The spur gear 14 and the pinion 16 are housed in a casing 18, which is connected for rotary motion about the axle 15 of the sprocket wheel and which has a lateral tubular extension 19 which forms a bearing for the shaft 17 and which is journaled or pivotally connected in the main frame 1 of the vehicle.

It will thus be seen that the housing 18 forms a link connection between the track mechanism and the main frame of the vehicle.

To provide a spring mounting for the rear end of the vehicle body, a lug 20 extends rearwardly of the casing 18 and forms a seat for a resilient element, such as the coiled compression spring 21, upon which rests a lug 22 which extends laterally of the vehicle body 1 adjacent the rear end thereof.

The forward end of the vehicle body is resiliently hung from the track mechanism in any way, but, as herein shown, a guide frame or bracket 23 is supported by the frame 4 and in this bracket a lug 24 extending laterally from the body 1 is reciprocable vertically, the lug being retained in normal position by a resilient element, such as the coiled compression spring 25, which is seated within the guide frame and the lug. It is also to be noted that the bracket 13 heretofore mentioned preferably forms an integral part of the guide frame 23. It will be understood that the body of the tractor is resiliently hung between the tractive elements and that there is a link connection between each tractive element and the tractor body, whereby the body may oscillate vertically with respect to the tractive elements.

Having described the invention, what I claim as new and desire to secure by Letters Patent, is:—

1. A mobile vehicle including tractive mechanism, a body resiliently hung at one end of the mechanism, gearing for driving said mechanism, a gearing housing forming a movable connection between the other end of the body and the tractive mechanism, and a resilient element suspending said latter end and interposed between the body and housing.

2. A mobile vehicle including tractive mechanism, a body resiliently hung at one portion of the mechanism, gearing for driving said mechanism, a gearing housing forming a movable connection between said body and tractive mechanism, and a resilient element forming cushioning means between another portion of said mechanism and body, said housing being spaced longitudinally along the tractive mechanism with respect to the point at which the body is resiliently hung.

3. A mobile vehicle including tractive mechanism, a body, a spring operative between said mechanism and body, gearing for driving said mechanism, and a gearing housing forming a movable connection between said body and tractive mechanism, said spring and housing being in spaced relationship along the length of said tractive mechanism.

4. A mobile vehicle including tractive mechanism, a body suspended from the tractive mechanism, gearing for driving the tractive mechanism, a housing for the gearing linking the body to the tractive mechanism, and a resilient element interposed between the housing and the body and forming a suspension for the body.

5. A mobile vehicle including tractive mechanism, a body suspended from the tractive mechanism, gearing between said tractive mechanism and the body, a housing for said gearing, a lug extending from the housing, and a resilient element supported on the lug and engaging the body to suspend the same.

BENJAMIN S. PFEIFFER.

Witnesses:
 MARGARET M. PFEIFFER,
 MARION I. PFEIFFER.